No. 703,144. Patented June 24, 1902.
J. H. MASON.
ELECTRIC MOTOR.
(Application filed Nov. 23, 1900.)

(No Model.)

Witnesses
Edward Rowland
Marie M. Hovey

James H. Mason Inventor
By his Attorney H. S. MacKaye

THE NORRIS PETERS CO., PHOTO-LITHO., WASHINGTON, D. C.

UNITED STATES PATENT OFFICE.

JAMES H. MASON, OF BROOKLYN, NEW YORK.

ELECTRIC MOTOR.

SPECIFICATION forming part of Letters Patent No. 703,144, dated June 24, 1902.

Application filed November 23, 1900. Serial No. 37,427. (No model.)

*To all whom it may concern:*

Be it known that I, JAMES H. MASON, a citizen of the United States, residing in the borough of Brooklyn, in the city of New York, in the county of Kings and State of New York, have invented a certain new and useful Improvement in Electric Motors, of which the following is a specification.

My present invention has for its object the provision of means whereby small motors may be cheaply made for producing a maximum torque, and my improvement embodies, as far as possible in small motors, the best principles of efficient construction.

My invention is illustrated in the accompanying drawings, wherein—

Figure 1:
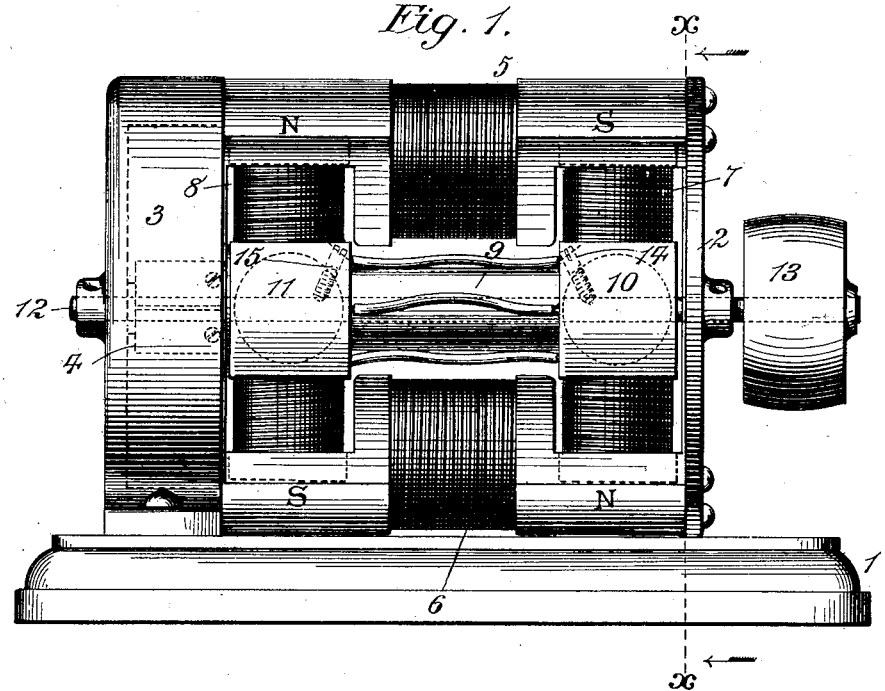
Figure 2:
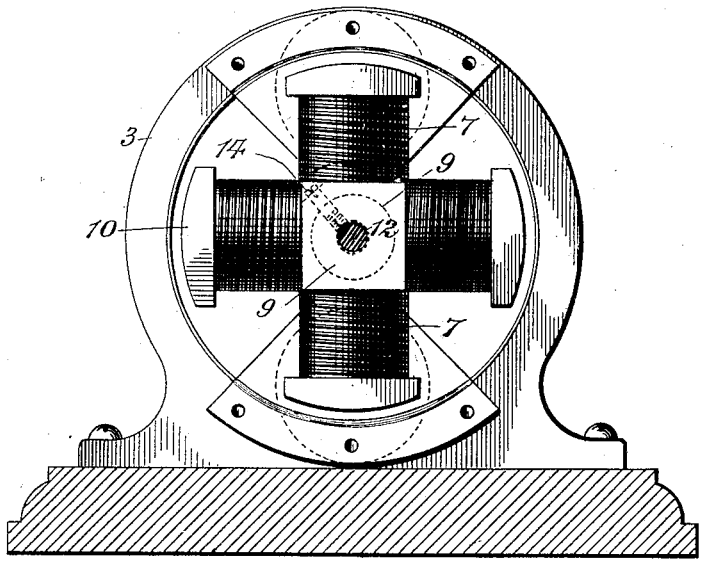

Figure 1 is a side view of a motor made in accordance with my invention, and Fig. 2 is a side view of the same looking with the arrow in Fig. 1 and with the side plate and pulley removed.

The base 1 has attached to it the end plate 2 and ring 3, preferably made of brass. The ring 3 is made deep enough so that the commutator 4 (shown in dotted lines) may be accommodated within it. Between these end supports 2 and 3 I fasten two horizontal field-magnets wound each in the middle, as at 5 and 6, and having poles of opposite signs facing each other, as indicated by the letters "N," "S," "N," "S." The vertical pairs of poles are so shaped on each side as to form a partial inclosure or round chamber, within which each section of the double armature revolves. These armature-sections are shown at 7 and 8, respectively, and each consists of a four-armed body, having curved pole-pieces beyond the windings on said arms, said pole-pieces being constructed to revolve very close to the field-magnet poles within which each armature-section turns. The central cores or nucleii of the two armature-sections are joined by an iron sleeve 9, whereby they form a single magnetic whole. The advantage of this construction lies in the fact that the magnetized portions of the armature form virtually two horseshoe-magnets back to back, whose outwardly-turned poles are presented to the opposing, and therefore attracting, field-magnet poles. In the position of the armature shown the horizontally-placed poles, whose ends are seen at 10 and 11, are dead, while the vertically-placed poles form the ends of opposed horseshoe-magnets, the sleeve 9 serving to carry the lines of force from one armature-section to the other, and thus constituting the neutral portion of the horseshoe-magnets. The entire armature carries with it in its revolutions the shaft 12, whence power may be taken off from the pulley 13 or otherwise.

While for convenience of construction I prefer to fasten the two separate armature-sections by means of screws 14 and 15 or otherwise, the sleeve 9 constituting a separate element clamped between said sections, I am not to be understood as limiting myself to that detail of construction in my broader claims.

The relative arrangement in circuit of the windings shown may be any one of many well known in this art, and I have therefore not shown any specific arrangement of such circuits herein, as that detail forms no part of my present invention.

What I claim is—

1. In an electric motor, an armature in two sections, separate windings on said sections and an iron sleeve joining said sections, whereby the armature is made to virtually consist of horseshoe-magnets with outwardly-turned poles and with neutral points in said sleeve.

2. In an electric motor, two separate armature-sections, each composed of radially-placed arms carrying pole-pieces at their extremities, windings on said arms, an armature-shaft, means for fastening said sections to said shaft and a separate iron sleeve clamped between said sections.

JAMES H. MASON.

Witnesses:
NEWTON HARRISON,
HAROLD S. MACKAYE.